United States Patent [19]
Ito et al.

[11] Patent Number: 5,906,041
[45] Date of Patent: May 25, 1999

[54] MACHINE AND A METHOD FOR DRIVING INSERTS INTO PIECES OF SHEET METAL

[75] Inventors: Katsuhide Ito; Mario Scavino, both of Turin, Italy

[73] Assignee: Amada America, Inc., Buena Park, Calif.

[21] Appl. No.: 08/613,167

[22] Filed: Mar. 8, 1996

[30] Foreign Application Priority Data

Mar. 10, 1995 [IT] Italy .................................. TO95A0183

[51] Int. Cl.⁶ .................................................. B23P 19/00
[52] U.S. Cl. ............................ 29/809; 29/243.5; 29/818; 221/268; 227/135
[58] Field of Search ..................................... 221/268, 272, 221/197, 232, 92, 94, 95; 29/798, 809, 811.12, 813, 815, 818, 243.5; 227/135

[56] References Cited

U.S. PATENT DOCUMENTS

| | | |
|---|---|---|
| 3,465,410 | 9/1969 | Ernest et al. . |
| 3,960,191 | 6/1976 | Murray . |
| 4,345,371 | 8/1982 | Ohsawa et al. . |
| 4,815,206 | 3/1989 | Jangaard . |
| 4,861,214 | 8/1989 | Sander . |
| 4,969,582 | 11/1990 | Gauger ................................. 221/268 X |
| 5,465,868 | 11/1995 | Bonomi . |

OTHER PUBLICATIONS

*The History of the Auto–Sert Press,* Auto–Sert, Inc., Minneapolis, Minnesota, May 1993.
"Hardware Inserting Press Comparison Notes", Auto–Sert, Inc., Minneapolis, Minnesota, Apr. 1993.
Brochures for Auto–Sert AS 7.5 Press, Auto–Sert, Inc., Minneapolis, Minnesota.
Brochure for "Pemserter Series 1000: 8–Ton Automatic Press System", Penn Engineering & Manufacturing Corp., Danboro, Pennsylvania, 1990.
"Self–Clinching Fasteners Improve Assembly Process", Leon M. Attarian, MAN Magazine, Apr. 1994.
Brochure for Haeger 824 Press, Haeger, Inc., Oakdale, California.

*Primary Examiner*—Joseph M. Gorski
*Attorney, Agent, or Firm*—Greenblum & Bernstein P.L.C.

[57] ABSTRACT

A machine for driving inserts into pieces of sheet metal includes an automatic loading device having a plurality of cartridges containing inserts of different types. Each cartridge can be connected selectively to an insert-supply duct integral with the punch.

9 Claims, 6 Drawing Sheets

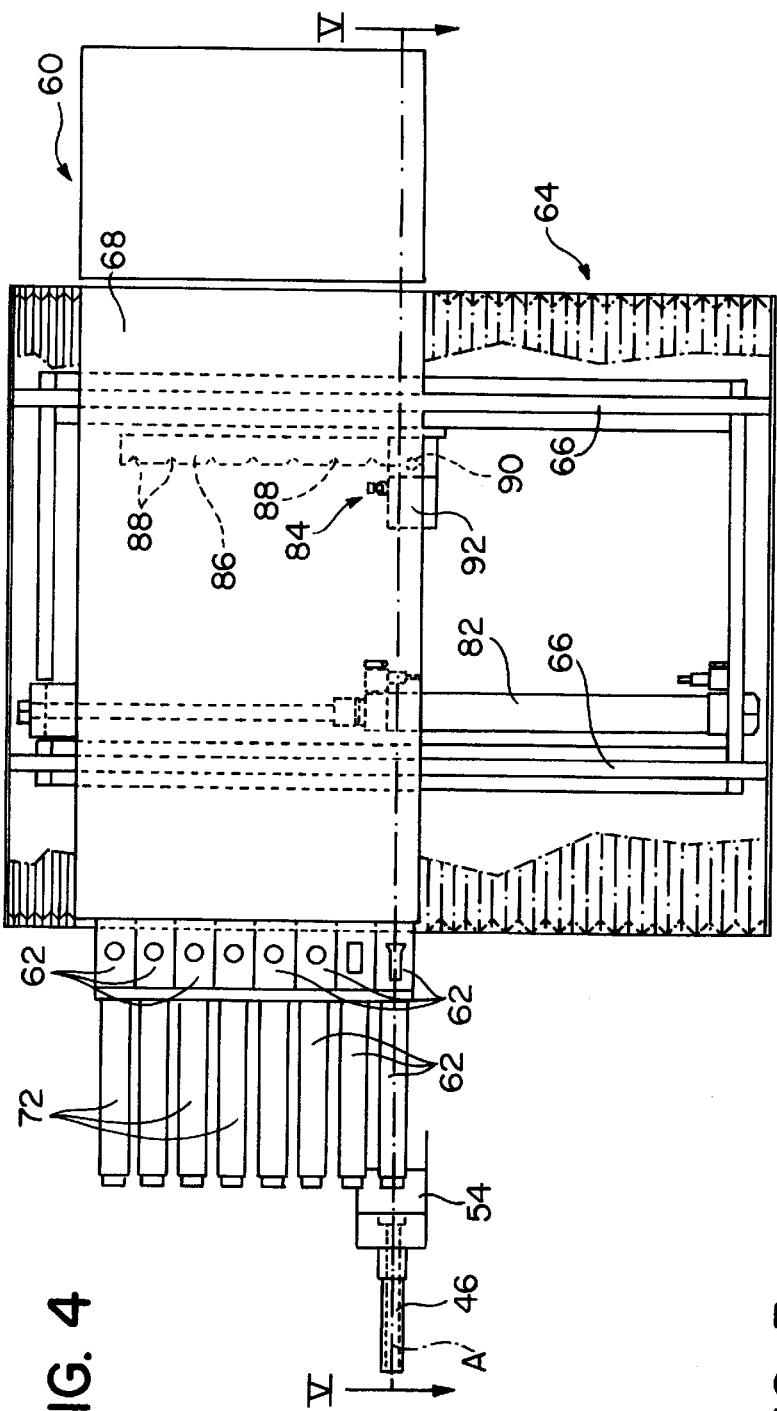
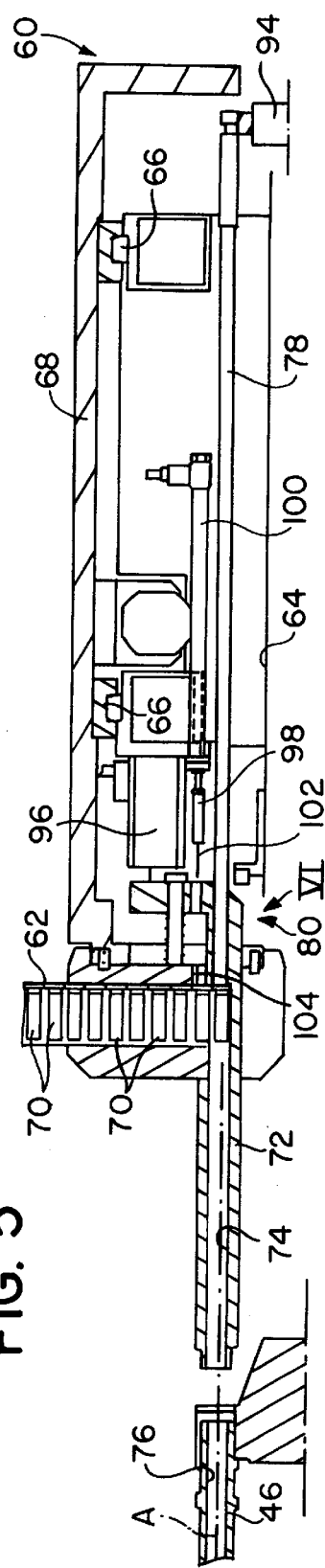
FIG. 4
FIG. 5

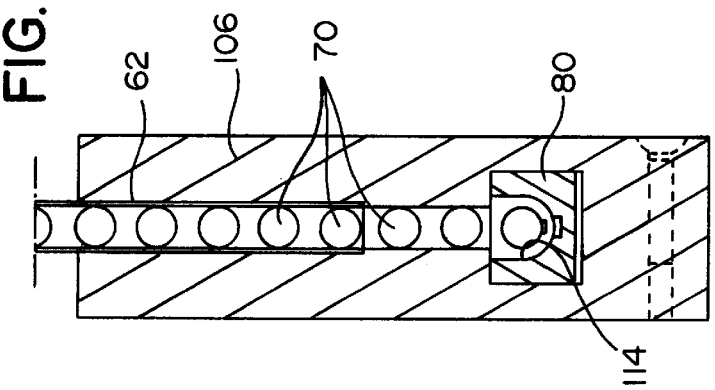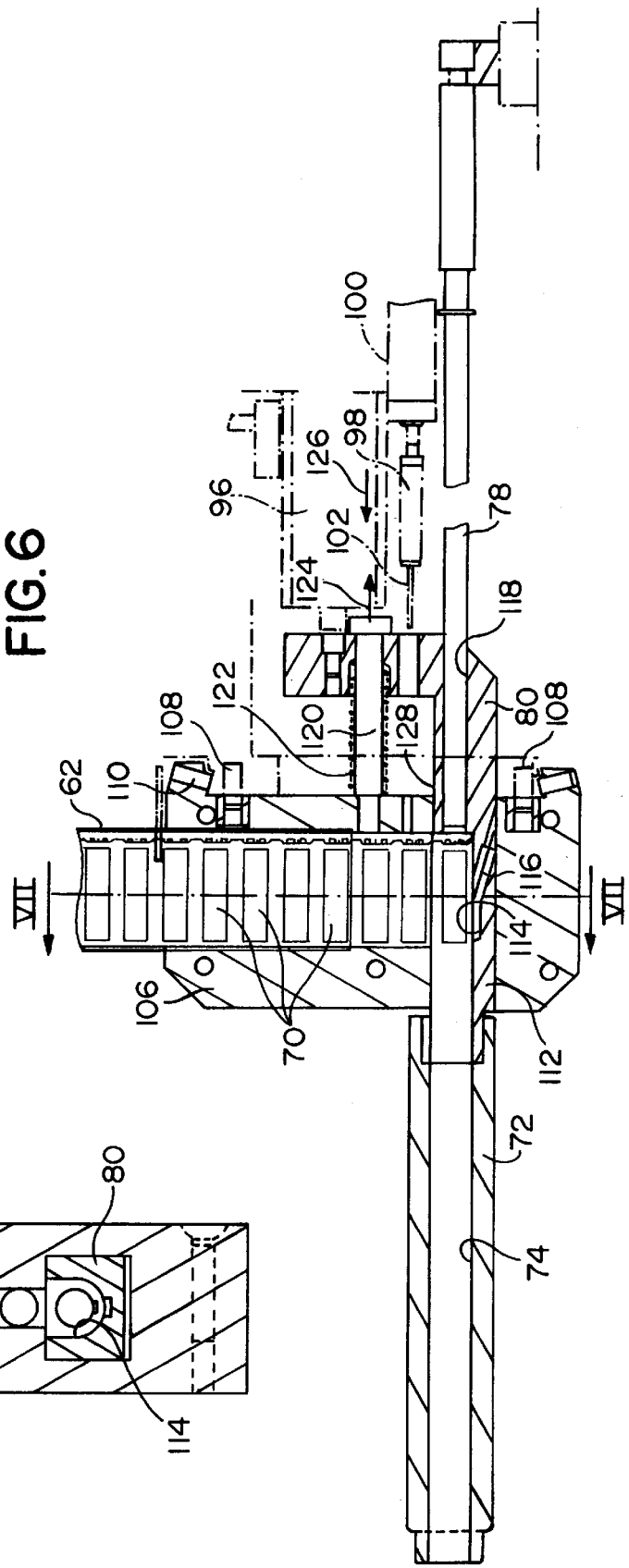

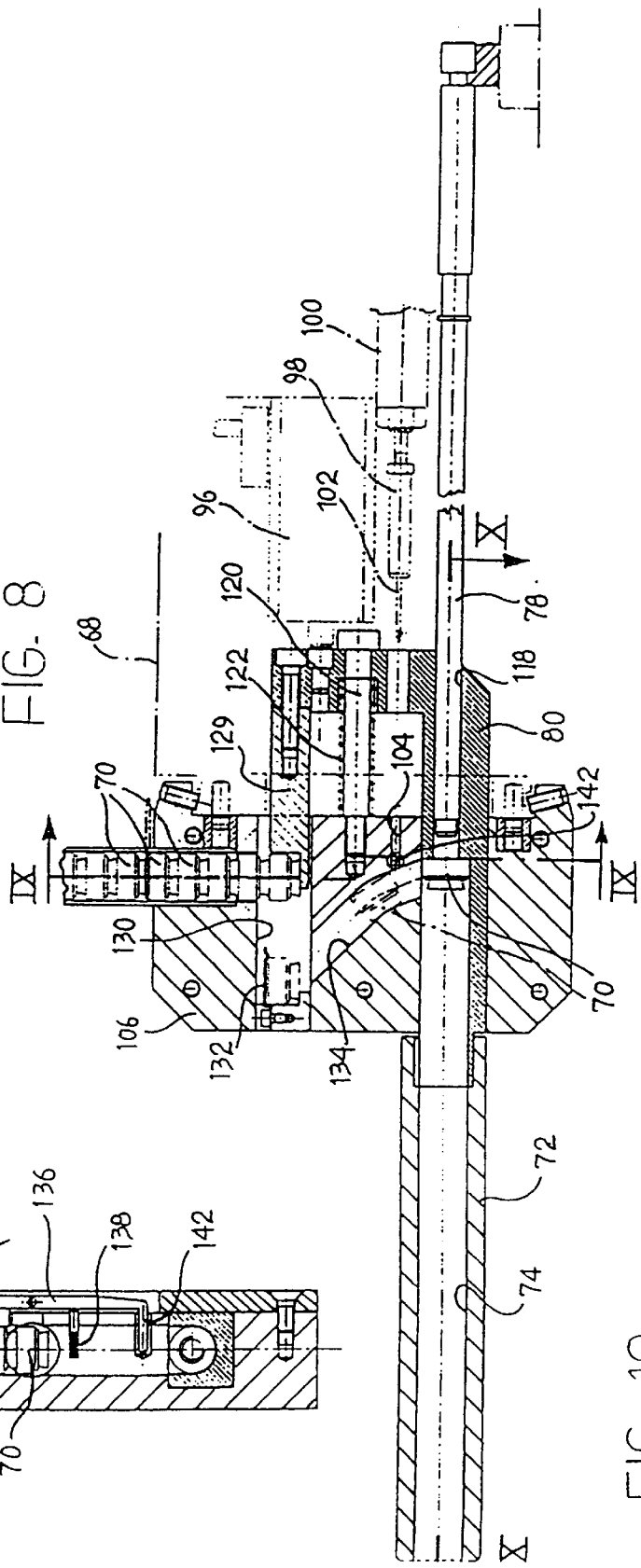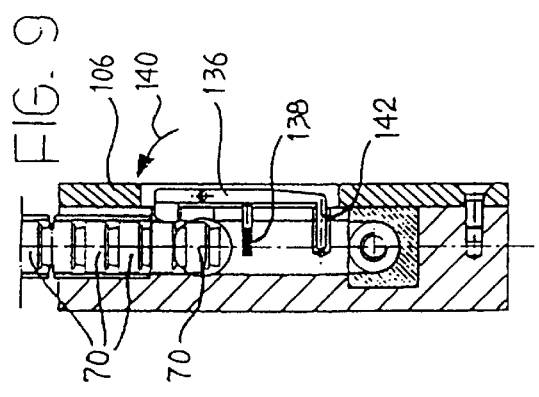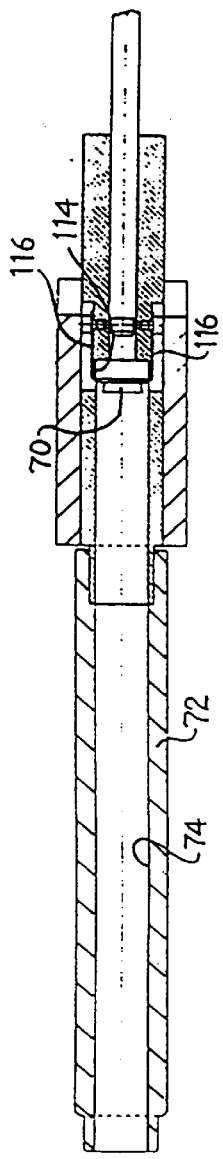

MACHINE AND A METHOD FOR DRIVING INSERTS INTO PIECES OF SHEET METAL

BACKGROUND OF THE INVENTION

1. Field of the Invention

The present disclosure is related to the disclosures provided in the following U.S. applications filed concurrently herewith: "A Device For Driving Inserts Into Pieces Of Sheet Metal", filed in the names of M. SCAVINO et al. (U.S. Ser. No. 08/613,142); and "A Machine And A Method For Driving Inserts Into Pieces Of Sheet Metal", filed in the name of K. ITO (U.S. Ser. No. 08/63,171); and the disclosures of the aforementioned applications are hereby expressly incorporated by reference herein in their entireties.

The present invention is related to a machine and to a method for driving inserts into pieces of sheet metal.

2. Description of Background Information

In the field of the production of elements formed by bent or pressed metal sheets, there is often a need to form threaded or non-threaded fixing or anchoring points on the internal or external surface of the sheet-metal element. This need is experienced particularly in the case of aluminum sheets in which it is difficult to produce threaded holes because of the mechanical properties of aluminum.

The inserts are generally formed of metal and are driven into preformed holes in sheets of metal (aluminum, steel or other materials). The inserts may be of various shapes and dimensions according to the function which they are intended to perform. The most common inserts have a hole or a shank which is generally threaded in order to form anchor equipment, components and the like to the sheet metal, by screwing the equipment, component or the like to the metal sheet via the insert.

A press is normally used to drive the inserts into the preformed holes in the metal sheets. Generally, the press includes a punch and a die which cooperate with one another, and between which a driving zone is defined. The inserts are anchored to the sheet when they are force-fitted into the respective holes in the sheet, so as to bring about plastic deformation of the portion of the metal sheet adjacent the hole into which the insert is force-fitted.

In the machines currently available, the press is operated manually by an operator who holds the piece of sheet metal during the driving of the inserts and moves the piece after each driving operation. Some machines have an automatic supply device, which generally has vibration feeders that send the inserts to the driving zone by various systems. Devices having the vibration feeder type automatic suppliers are useful only when repeatedly performing insertion of a large number of inserts which are all of the same type and size.

In practice, there is often a need to successively drive a plurality of different inserts, which differ from one another in function, shape or size, into the same piece. When there is such a need, the operator of some known machines must position the inserts in the driving zone of the press manually.

This results in a high labor cost of production, low productivity, a high risk of error and a high risk of accidents to the operator, because of the dangerous nature of the operation.

In cases where machines with automatic insert-supplies are used, it is still necessary to manually empty the insert container and fill it with the new inserts each time a requirement for a different type or size insert is required. Moreover, if the new inserts are significantly different in shape and/or size from the inserts being removed from the container, it is often necessary to replace the supply duct which transfers the inserts from the container to the driving zone.

This results in a long tooling time which makes it economically unfeasible to drive different inserts into the same piece in succession.

SUMMARY OF THE INVENTION

An object of the present invention is to provide a machine and a method for driving inserts which overcome the aforementioned problems.

A further object of the present invention is to provide a machine and a method for driving inserts which, in comparison with known solutions, decreases the cost and the time necessary to carry out the driving.

Another object of the present invention is to increase the safety of driving operations in which it is necessary to successively drive inserts of various sizes and shapes.

Yet another object of the present invention is to decrease the tooling time necessary to adapt a driving machine to drive inserts of various sizes and shapes.

Still another object is to decrease the labor required to successively drive inserts of various sizes and shapes, and to increase the reliability of such driving, and to eliminate the need for inspection of the piece upon completion of the driving operation.

According to the present invention, these objects are achieved by providing a machine for driving inserts into pieces of sheet metal, which includes a punch and a die forming a driving zone therebetween. An insert can be gripped in the driving zone for positioning it to be driven into a hole in a piece of sheet metal which is also positioned in the driving zone.

An automatic loading device is provided for supplying inserts, one at a time, to the driving zone. A driver is provided for applying a driving force to the punch for driving the inserts. The automatic loading device includes a plurality of cartridges which are selectively connectable to a supply duct, which is integral with the punch, for supplying the inserts to the driving zone. Each of the plurality of cartridges contains a plurality of identical type inserts. The inserts contained in each of the plurality of different cartridges, however, are of a different type than the inserts contained in at least one other of the plurality of different cartridges.

The automatic loading device preferably further includes a movable support which carries the plurality of cartridges, and a plurality of tubular members associated with the plurality of cartridges. The inserts contained within the plurality of cartridges can pass through the associated tubular members, and the tubular members are selectively associable with the supply duct as a result of movement of the movable support to define a path for supplying the inserts. The path for supplying the inserts extends from one of the plurality of cartridges, which is in an operative position as a result of selecting one of the tubular members, to the driving zone.

The selectively associated tubular member includes a cavity which forms an initial portion of the supply path for the inserts. The supply duct forms an end portion of the supply path. The cavity and the supply duct form the supply path as a straight, continuous path.

The movable support is movable relative to the punch along a straight axis perpendicular to an axis of the supply duct. The plurality of tubular members are disposed side by side along the straight axis of movement of the movable support.

The machine according to the present invention further includes a stationary base, a slide slidably mounted to the stationary base and supporting the punch, and an actuator mounted to the stationary base. The actuator generates a force for driving the punch and the punch thereby drives the inserts, one at a time. The slide also supports the automatic loading device, such that sliding movement of the slide with respect to the stationary base moves the punch and the automatic loading device by equal distances. The sliding movement of the slide is in a substantially horizontal direction. Each of the plurality of cartridges contains a pile of inserts disposed substantially vertically therein.

Still further, the machine preferably includes a stepped movement mechanism with a fluid actuator, and a separate stop device having a number of stop positions at least equal to the number of plurality of cartridges carried by the machine. The stepped movement mechanism drives movement of the movable support to locate one of the plurality of cartridges in the operative position, and the separate stop device stops movement of the movable support by actuating an associated one of the stop positions.

The automatic loading device further preferably includes a supply unit for the inserts contained by each of the plurality of cartridges. The supply unit includes an individual supply member for positioning individual inserts taken from the cartridge in the operative position in the initial portion of the supply path. The supply unit further preferably includes a thrust rod for pushing the inserts. The thrust rod is aligned with the supply path for the inserts. After insertion of an insert in the supply path by the individual supply member, the thrust rod pushes the insert to the driving zone.

Still further, the automatic loading device preferably includes a first actuator for actuating the individual supply member, and a second actuator for actuating the thrust rod. The first and second actuators are mounted in a stationary position relative to the punch to move the insert towards the punch by respective movements of the individual supply member and the thrust rod with respect to the punch.

Further yet, the automatic loading device preferably includes a feeler for detecting the presence or absence of inserts in the cartridge in the operative position.

The inserts are piled up in at least one of the plurality of cartridges along an axis perpendicular to longitudinal axes of the inserts. In such an arrangement, the plurality of cartridges are positioned so that the inserts fall into the individual supply member along the axis of the pile.

Additionally, inserts may be piled up in at least one of the plurality of cartridges in a direction along the longitudinal axes of the inserts. In this case, a turning device is disposed between the plurality of cartridges and the individual supply member to turn the inserts piled up in a direction along the longitudinal axes, by 90° with respect to an axis of alignment of the pile, before falling into position into the individual supply member.

Further disclosed is a method of driving inserts into pieces of sheet metal using a punch and a die which form a driving zone therebetween. The method includes: providing a plurality of cartridges containing inserts of various types; selecting one of the plurality of cartridges containing inserts of the type desired to be driven and moving the selected cartridge into an operative position; and transferring an insert from the selected cartridge to the driving zone along a straight path which extends partially through a tubular member connected to the selected cartridge and partially through a supply duct defined inside the punch.

The present disclosure relates to subject matter contained in Italian patent application No. TO95 A 000183 (filed on Mar. 10, 1995) which is expressly incorporated by reference herein in its entirety.

BRIEF DESCRIPTION OF THE DRAWINGS

Further characteristics and advantages of the present invention will become clear in the course of the detailed description which follows purely by way of non-limiting example, with reference to the appended drawings, in which:

FIG. 4 is a plan view of the part indicated by the arrow IV in FIG. 3, on an enlarged scale;

FIG. 5 is a sectional view taken along the line V—V in FIG. 4;

FIG. 6 is a sectional view of the part indicated by the arrow VI in FIG. 5, on an enlarged scale;

FIG. 7 is a sectional view taken along the line VII—VII in FIG. 6;

FIG. 8 is a sectional view similar to that of FIG. 6, but showing a cartridge containing inserts of a different type;

FIG. 9 is a sectional view taken along line IX—IX in FIG. 8; and

FIG. 10 is a sectional taken along line X—X in FIG. 8.

DESCRIPTION OF THE PREFERRED EMBODIMENTS

Figure 1:
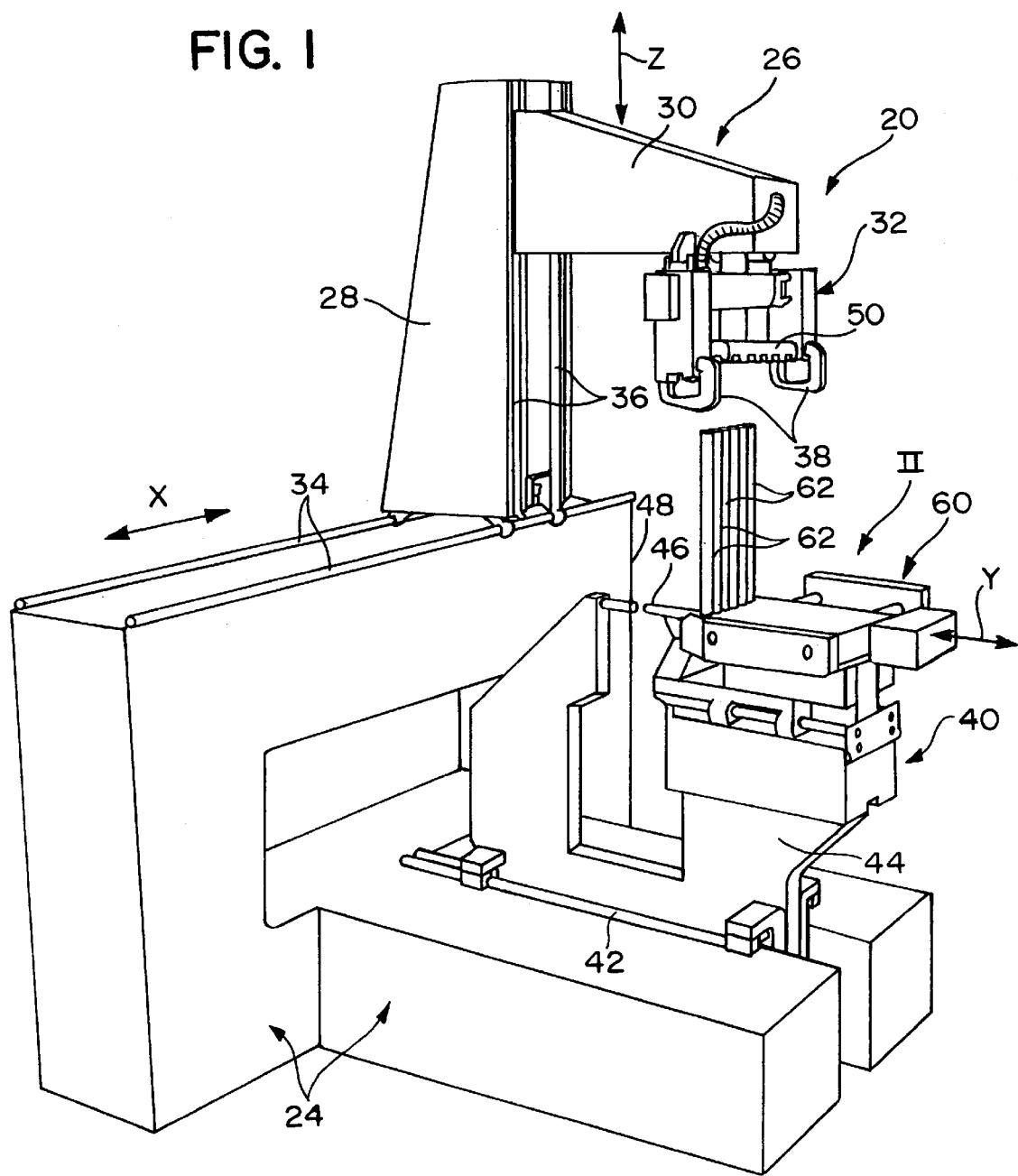
FIG. 1 is a schematic, perspective view of a machine according to the present invention.

Referring now to the drawings in detail, FIG. 1 shows a machine 20 for driving inserts into pieces of sheet metal. The machine 20 includes a base 24 on which a piece-holder 26 is slidably mounted. The piece-holder 26 includes a carriage 28, a vertically-movable slide 30 and a piece-holder unit 32, all of which are movable together along an axis X shown in FIG. 1. The carriage 28 is movable relative to the base 24 along guides 34 to enable the aforementioned movement along the X axis.

The carriage 28 includes guides 36 mounted vertically therealong (i.e., along the "Z axis" shown in FIG. 1). The vertically movable slide 30 is movable relative to the carriage 28 along the guides 36 to enable the vertically movable slide 30 and piece holder 32 to move along the Z axis with respect to the base 24.

The piece-holder unit 32 includes grippers 38 which grip and hold the piece being processed in a generally vertical arrangement. Such an arrangement advantageously prevents problems connected with deformations of the piece which can occur due to gravitational effects on a horizontal sheet. For example, in FIG. 2, a piece of sheet metal 22 is shown in phantom being gripped by grippers 38. The particulars of the piece-holder unit 32 are described in detail in the application entitled "A Machine And A Method For Driving Inserts Into Pieces Of Sheet Metal", filed in the name of K. ITO (U.S. Ser. No. 08/613,171), which has been incorporated by reference above.

The machine 20 further includes a press 40 which is movable on guides 42 along a "Y axis" defined in FIG. 1, with respect to the base 24. The press 40 has a base structure 44 having a generally U-shaped configuration. The base structure 44 carries insert-driving equipment comprising a punch 46 and a die 48. The insert-driving equipment 46, 48 is preferably of the type described in detail in the application entitled "A Device For Driving Inserts Into Pieces Of Sheet Metal", filed in the names of M. SCAVINO et al. (U.S. Ser. No. 08/613,142), which has been incorporated by reference above. The punch 46 and the die 48 grip an insert between them and insert the insert forcibly through a preformed hole in the piece of sheet metal.

The punch 46 and the die 48 are carried by the press 40 in a way in which they can be quickly replaced, by an automatic procedure, with tools of a different type suitable for driving inserts of a different shape or size, when the need arises. The vertically movable slide 30 carries a store 50 of replacement tools.

Figure 2:
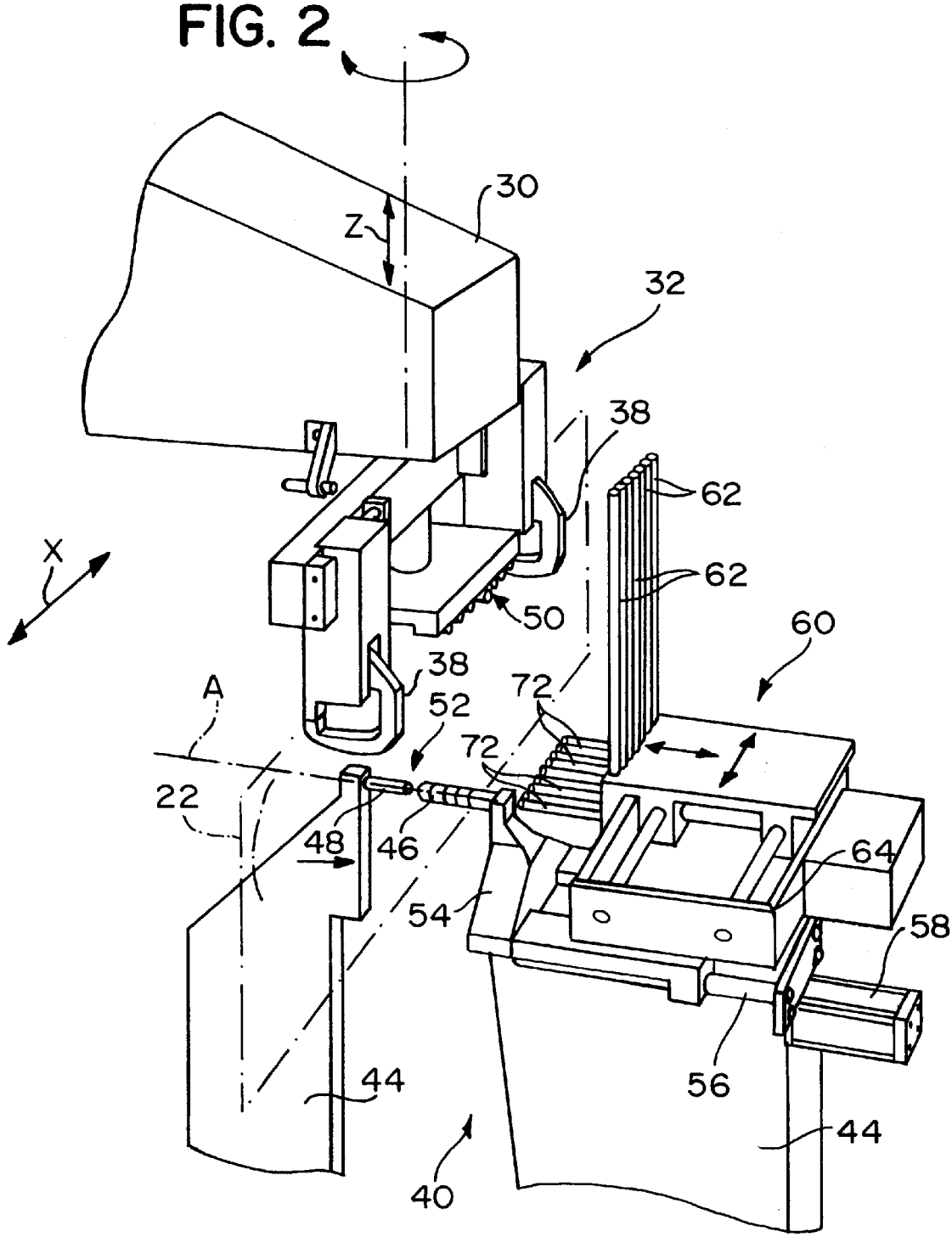
FIG. 2 is a perspective view showing the part indicated by the arrow II in FIG. 1 in greater detail.
Figure 3:
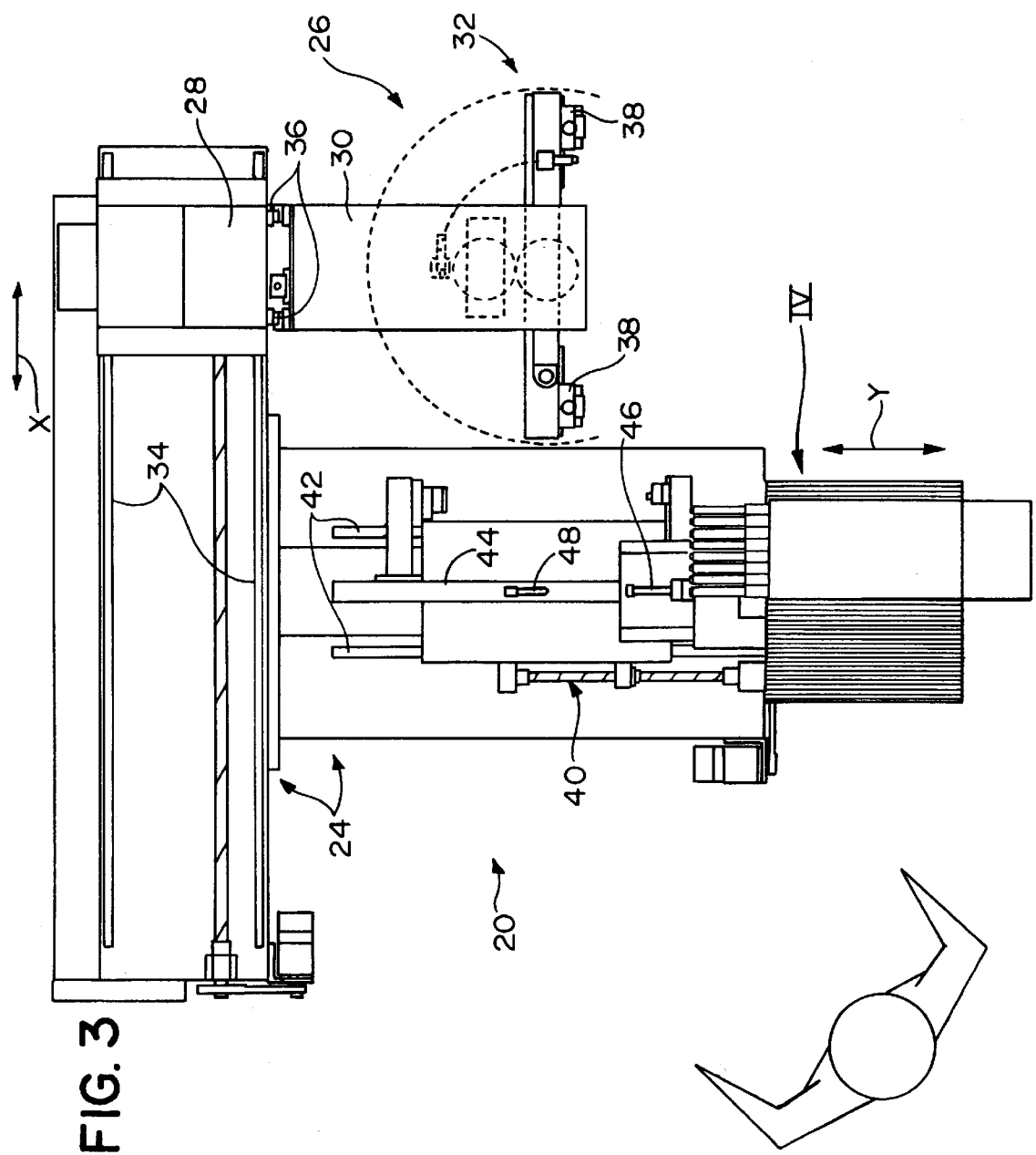
FIG. 3 is a plan view, in the X-Y plane, of the machine of FIG. 1.

Referring to FIG. 2, the punch 46 and the die 48 are aligned on a horizontal axis A coinciding with the axis along which the inserts are driven and parallel to the Y-axis. The punch 46 and die 48 define a driving zone 52 between them. The die 48 is stationary relative to the base structure 44 of the press, whereas the punch 46 has a working stroke along the axis A. For this purpose, a slide 54 is movably mounted relative to the structure 44, along the axis A, on guides 56. The slide 54 supports the punch 46 and enables movement of the punch 46 along the A axis.

The movement of the slide 54 relative to the base structure 44 is driven by an actuator 58 which may be an electric or fluid actuator of a size designed to produce a force appropriate for the driving of the inserts.

An automatic loading device 60 is disposed on the slide 54 in order to supply the inserts to the driving zone 52. The automatic loading device 60 includes a series of cartridges 62 each of which contains an orderly arrangement of inserts of a type, size or shape different from the other cartridges. A particular cartridge 62 is selected according to the type of insert to be driven and an insert is taken from the cartridge and supplied to the driving zone 52 along a straight transfer path, the end portion of which extends through the punch 46.

Various geometrical arrangements are possible for the automatic loading device and transfer path. A preferred embodiment will be described below but should not be interpreted as a limitation of the general operating principle described briefly above.

Referring to FIGS. 4 and 5, the automatic loading device 60 includes a fixed base 64 which is fixed with respect to the slide 54. The base 64 has guides 66 mounted transversely with respect to the axis A. A support 68 is slidably mounted to the fixed base 64 and is slidable on guides 66. The support 68 carries the cartridges 62 and slides on the guides 66 to enable selection of a particular cartridge 62.

Each cartridge 62 contains a pile of inserts 70 disposed vertically (see FIG. 5). Inserts which are relatively elongate in shape, and have with axial dimensions longer than the diameters of their cross-sections, are piled up along an axis perpendicular to their longitudinal axes. Short inserts which have diameters longer than their axial dimensions, however, are piled up in the direction of their longitudinal axes. The two piling arrangements enables the largest possible number of inserts to be stored in the cartridges for a given height of the cartridges.

Each cartridge 62 is associated with a tubular member 72 having a hole 74 which constitutes the first part of a path for the transfer of the inserts to the driving zone 52. The end portion of the transfer path is defined by a duct 76 formed inside the punch 46.

The structure of the punch 46 which allows the inserts to be supplied to the driving zone 52 through the duct 76 of the punch 46 is described in detail in the application entitled "A Device For Driving Inserts Into Pieces Of Sheet Metal", filed in the names of M. SCAVINO et al. (U.S. Ser. No. 08/613,142), which has been incorporated by reference above.

A movement mechanism is provided to move the movable support 68 in order to align the desired tubular member 72 and associated cartridge 62 to a position in which it is aligned with the axis A of the punch 46. In the embodiment shown in the drawings, the movement mechanism is a stepped movement mechanism formed by a fluid actuator 82 with a separate stop device 84 having a number of stop positions equal to the number of cartridges 62. The stop device 84 includes a rod 86 having a series of incisions 88 which can be engaged by a pin 90. An actuator 92 is provided to move pin to the desired stop position. One of the actuator 92 and the rod 86 is fixed to the fixed base 64 and the other is fixed to the movable support 68.

Thus, the cartridge containing the desired type of insert to be driven is selected and is brought, by a movement of the support 68, to an operative position in which the selected cartridge is aligned with the punch 46. When the type of insert to be driven is changed, it may also be necessary to replace the punch 46, e.g., when the new insert to be driven has a significantly different diameter from the previously driven insert. The manner in which the punch 46 or the punch 46-die 48 pair are replaced is described in detail in the application entitled "A Machine And A Method For Driving Inserts Into Pieces Of Sheet Metal", filed in the name of K. ITO (U.S. Ser. No. 08/613,171), which has been incorporated by reference above.

The automatic loading device 60 includes a thrust rod 78 and an individual supply member 80 corresponding to each individual cartridge 62. The thrust rod 78 and the individual supply member 80 are fixed to the respective cartridge 62 and to the respective tubular member 72 for movements transverse to the axis A. Both the thrust rod 78 and the individual supply member 80 are movable along the axis A relative to the support 68.

The thrust rod 78 associated with the selected cartridge 62 is placed in an operative position and engages a drive member 94 connected to an actuator (not shown). The actuator drives the drive member 94 to move the thrust rod 78 along the axis A. Similarly, an actuator 96 is provided to move the individual supply member 80, associated with the selected cartridge 62 which is in the operative position, along the axis A. Both the actuator 96 and the actuator which brings about the movement of the thrust rod 78 are mounted in stationary positions relative to the punch 46 to move only the individual supply member 80 and the thrust rod 78 which are associated with the cartridge 62 situated in the working position.

A feeler device 98 is provided for checking the presence of inserts in the selected cartridge 62 located in the working position. An actuator 100 actuates the feeler 98 to insert a feeler rod 102 through a hole 104 and detects the presence or absence of an insert at the bottom of the pile in the cartridge 62.

FIG. 6 shows the structure and arrangement for piling up and supplying inserts which are elongated, as defined above. The elongated inserts are piled up along an axis perpendicular to their longitudinal axes. The cartridge 62 includes an opening at the bottom to allow passage of an insert therethrough. The cartridge is inserted in a cartridge-holder body 106 which is fixed to the movable support 68 by means of locating pins 108 and fixing screws 110.

The individual supply member 80 includes an appendage 112 which extends through a hole in the cartridge-holder body 106 and inserts into the tubular member 72 which corresponds to the selected cartridge 62.

FIG. 7 shows that the individual supply member 80 is U-shaped in cross-section to cradle the cartridge 62. The inner surface of the U-shaped member forms a seat 114 that the inserts 70 can fall into in succession. A flat spring 116 (FIG. 6) extends into the seat 114 for assisting in the positioning the inserts 70. The individual supply member 80 has a hole 118 in which the thrust rod 78 is slidable. Hole 118 is axially aligned with the axis A.

A pin 120 is fixed to the cartridge-holder body 106 and guides the movement of the individual supply member 80 with respect to the cartridge-holder body 106. A helical spring 122 which is coaxial with and surrounds the pin 120, urges the individual supply member 80 in the direction indicated by the arrow 124.

A method for supplying a selected insert to the driving zone 52 is described as follows. After selecting the cartridge containing the type of insert desired and positioning the selected cartridge in the working position as described above, the individual supply member 80 corresponding to the selected cartridge 62 aligns with the actuator 96.

The actuator 96 urges the individual supply member 80 in the direction indicated by the arrow 126. At the same time, the actuator 100 actuates the feeler device 98 to extend the feeler rod through hole 104 to check for the existence of an insert in the cartridge 62. If the feeler rod does not detect an insert 70, the need to replace the cartridge 62 before supplying further inserts of that type is indicated.

The movement of the individual supply member 80 forces the insert 70 occupying the seat 114 to a position nearer to the punch than its previously occupied position in alignment with the cartridge 62 (and closer than the aligned pile of inserts 70, if other inserts are still contained within the cartridge 62). A wall 128 of the individual supply member 80 supports the rest of the inserts 70. The insert which has thus been separated is ready to be supplied along the duct 74.

The separation of the insert from the cartridge prior to its transfer helps prevent interference with the other inserts during the transfer, thus minimizing the risk of jamming. The movement of the individual supply member 80 in the direction 126 also causes the tubular member 72 to move the same amount in the same direction, the tubular member 72 being be fixed on the individual supply member. This movement couples the distal end of the tubular member 72 with the duct 76 to form a continuous, uninterrupted duct extending from the base of the cartridge to the driving zone 52.

Immediately after separation of the insert 70 at the bottom of the pile, the drive member 94 actuates the thrust rod 78 to push the insert 70 to the distal end of the duct 76.

FIG. 8 shows the structure and arrangement for piling up and supplying inserts which are short, and have a diameters which are greater than their lengths, as defined above. The inserts 70 must, of course, be transferred along the supply duct in the direction of their longitudinal axes which coincide with the axes along which they are to be driven. Short inserts therefore have to be turned through 90° before being transferred along the duct.

In order to carry out this operation, the individual supply members 80 associated with cartridges 62 containing short inserts 70 each have, in addition to the parts described above and indicated by the same reference numerals, a separator element 129 fixed to the individual supply member 80. The separator element 129 is movable in a cavity 130 formed in the cartridge-holder body 106 parallel to the axis A. A plate 132 is mounted at the end of the cavity 130. The separator element separates the bottom-most insert 70 from the stack and moves it to the end of cavity 130. Plate 132 receives and retains the insert 70 which has been moved by the separator element 129. As the separator element 129 moves away from the end of the cavity 130 to return to its starting position (a result of the return movement of the individual supply member 80), the insert 70 falls from the plate 132 and into a duct 134. The duct 134 guides the insert 70 to the correct position (i.e., rotated 90 degrees from the starting position) in the seat 114 in the individual supply member 80, in which it is held by a pair of plates 116, as shown in FIG. 10.

With short inserts, the presence of the duct 134 in which the inserts are rotated prevents the use of the above-described feeler device to detect presence or absence of inserts 70 in the region in which the feeler device 98 acts, since the duct 134 obstructs this region. To address this problem, as shown in FIG. 9, a rocker 136 is disposed in the cartridge-holder body 106. The rocker 136 is spring biased by a spring 138 in the direction indicated by the arrow 140. An end 142 of the rocker 136 is disposed facing the hole 104.

Thus, when inserts 70 are present in the cartridge 62, the rocker 136 is in the position shown in FIG. 9, and, when the detection is carried out, the feeler rod 102 contacts the end 142 of the rocker 136, thereby accurately detecting presence of inserts 70. When there is a lack of inserts, the rocker 136 rotates to a position in which the end 142 no longer faces the hole 104. Accordingly, the feeler rod 102 cannot contact the rocker end 142, and thus correctly detects the lack of inserts.

Although the invention has been described with reference to particular means, materials and embodiments, it is to be understood that the invention is not limited to the particulars disclosed and extends to all equivalents within the scope of the claims.

What is claimed:

1. A machine for driving inserts into pieces of sheet metal, comprising:

a punch and a die forming a driving zone therebetween, wherein an insert can be gripped in said driving zone for positioning to be driven into a hole in a piece of sheet metal which is also positioned in said driving zone;

an automatic loading device for supplying inserts, one at a time, to said driving zone;

a driver for applying a driving force to said punch for driving the inserts;

said automatic loading device including a plurality of cartridges being selectively connectable to a supply duct integral with said punch for supplying the inserts to said driving zone;

each of said plurality of cartridges containing a plurality of identical type inserts, and wherein the inserts contained in each of said plurality of cartridges are of a different type than the inserts contained in at least one other of said plurality of cartridges;

a movable support which carries said plurality of cartridges;

a plurality of tubular members associated with respective ones of said plurality of cartridges;

wherein the inserts contained within said plurality of cartridges can pass through said associated tubular members;

wherein said tubular members are selectively associable with said supply duct as a result of movement of said movable support to define a supply path for supplying the inserts, said supply path extending from one of said plurality of cartridges which is in an operative position as a result of selecting one of said tubular members, to said driving zone, said tubular members including a cavity which forms an initial portion of said supply path;

a supply unit for the inserts contained by each of said plurality of cartridges, wherein said supply unit includes an individual supply member for positioning individual inserts taken from said cartridge in said operative position in said initial portion of said supply path;

a thrust rod for pushing the inserts, said thrust rod being aligned with said supply path for the inserts;

a first actuator for actuating said individual supply member;

a second actuator for actuating said thrust rod, wherein said first and second actuators are mounted in a stationary position relative to said punch to move said insert towards said punch by respective movements of said individual supply member and said thrust rod with respect to said punch;

wherein after insertion of an insert in said supply path by said individual supply member, said thrust rod pushes the insert to said driving zone.

2. The machine according to claim 1, wherein said movable support is movable relative to said punch along a straight axis perpendicular to an axis of said supply duct; and wherein said plurality of tubular members are disposed side by side along said straight axis of movement of said movable support.

3. The machine according to claim 1, further comprising:

a stationary base;

a slide slidably mounted to said stationary base and supporting said punch;

an actuator mounted to said stationary base, wherein said actuator generates a force for driving said punch and said punch drives the inserts, one at a time; and wherein said slide also supports said automatic loading device, such that sliding movement of said slide with respect to said stationary base moves said punch and said automatic loading device by equal distances.

4. The machine according to claim 3, wherein said sliding movement of said slide is in a substantially horizontal direction.

5. The machine according to claim 4, wherein each of said plurality of cartridges contains a pile of inserts disposed substantially vertically therein.

6. The machine according to claim 1, further comprising:

a stepped movement mechanism with a fluid actuator; and a separate stop device having a number of stop positions at least equal to the number of said plurality of cartridges carried by the machine;

wherein said stepped movement mechanism drives said movement of said movable support to locate one of said plurality of cartridges in said operative position, and said separate stop device stops movement of said movable support by actuating an associated one of said stop positions.

7. The machine according to claim 1, wherein said automatic loading device further comprises:

a feeler for detecting the presence or absence of inserts in said cartridge in said operative position.

8. The machine according to claim 1, wherein the inserts are piled up in at least one of said plurality of cartridges along an axis perpendicular to longitudinal axes of the inserts; and wherein said at least one of said plurality of cartridges are positioned so that the inserts fall into said individual supply member along said axis of said pile.

9. The machine according to claim 1, wherein the inserts are piled up in at least one of said plurality of cartridges in a direction along the longitudinal axes of the inserts;

said machine further comprising a turning device disposed between said plurality of cartridges and said individual supply member to turn the inserts piled up in a direction along the longitudinal axes by 90° with respect to an axis of alignment of the pile, before falling into position into said individual supply member.

* * * * *